US008838950B2

(12) United States Patent
Craft et al.

(10) Patent No.: US 8,838,950 B2
(45) Date of Patent: Sep. 16, 2014

(54) SECURITY ARCHITECTURE FOR SYSTEM ON CHIP

(75) Inventors: David John Craft, Austin, TX (US); Michael Norman Day, Round Rock, TX (US); Harm Peter Hofstee, Austin, TX (US); Charles Ray Johns, Austin, TX (US); John Samuel Liberty, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1867 days.

(21) Appl. No.: 10/601,374

(22) Filed: Jun. 23, 2003

(65) Prior Publication Data
US 2005/0021944 A1 Jan. 27, 2005

(51) Int. Cl.
G06F 21/00 (2013.01)
H04L 9/32 (2006.01)
G06F 21/53 (2013.01)

(52) U.S. Cl.
CPC ............ *G06F 21/53* (2013.01); *H04L 2209/56* (2013.01); *H04L 9/3226* (2013.01)
USPC .............................................. 713/100; 713/1

(58) Field of Classification Search
CPC . G06F 21/53; G06F 21/74; G06F 2221/2105; G06F 21/57; G06F 7/723; G06F 2207/7242; H04L 9/08; H04L 2209/12; H04L 9/0656
USPC .......................................... 726/30; 713/1, 30
See application file for complete search history.

(56) References Cited

U.S. PATENT DOCUMENTS 6,769,062 B1* 7/2004 Smeets et al. .................. 713/189
7,082,615 B1* 7/2006 Ellison et al. .................... 726/26
2002/0194389 A1* 12/2002 Worley et al. .................. 709/310
2003/0140244 A1* 7/2003 Dahan et al. .................... 713/200
2003/0226014 A1* 12/2003 Schmidt et al. ............... 713/164
2004/0123118 A1* 6/2004 Dahan et al. .................... 713/189

FOREIGN PATENT DOCUMENTS

| JP | 10-501354 | 2/1998 |
| JP | 2001-514411 | 9/2001 |
| JP | 2001-524229 | 11/2001 |
| JP | 2004-518193 | 6/2004 |
| JP | 2004-527857 | 9/2004 |
| WO | WO 02/37242 A2 | 5/2002 |

OTHER PUBLICATIONS

Chappell, David; "The Active X Technology Increasing it's Importance as a Base of the Software Development"; Nikkei Byte, Japan, Nikkei Business Publication, Inc., Oct. 22, 1997, p. 348.
Chappell, David, "The ActiveX Technology Increasing it's Importance as a Base of the Software Development", Nikkei Byte, Oct. 22,1997, pp. 343-352, Nikkei Business Publication, Inc., Japan.

* cited by examiner

*Primary Examiner* — Philip Chea
*Assistant Examiner* — Carlton Johnson
(74) *Attorney, Agent, or Firm* — James L. Baudino

(57) ABSTRACT

The present invention provides for authenticating code and/or data and providing a protected environment for execution. The present invention provides for dynamically partitioning and un-partitioning a local store for the authentication of code or data. The local store is partitioned into an isolated and non-isolated section. Code or data is loaded into the isolated section. The code or data is authenticated in the isolated section of the local store. After authentication, the code is executed. After execution, the memory within the isolated region of the attached processor unit is erased, and the attached processor unit de-partitions the isolated section within the local store.

15 Claims, 2 Drawing Sheets

SECURITY ARCHITECTURE FOR SYSTEM ON CHIP

TECHNICAL FIELD

The invention relates generally to authenticating code and/or data in a chip and, more particularly, to authenticating and protecting code and/or data within an isolated section of an attached processor unit.

BACKGROUND

In modern microprocessors, support of security functions is of increasing importance. One primary reason is that increasingly, processors are networked. Communications to and from the network can be monitored and, therefore, cannot be trusted. This lack of security can require authentication and encryption functions to be performed in the constituent networked processors.

The use of networked computers for business purposes, such as enabling payment systems and so on, requires authentication and protection of data and, in cases where it is distributed over the network, code. Authentication can be generally defined as the determination as to whether code or data has been tampered with or otherwise altered. Hardware and software in a networked system can be proprietary. This can require support for such functions as authenticating the operating system image before it is invoked or started. On a non-proprietary system the user can run whatever software they choose. On a proprietary system, software is controlled by the system builder. A system can be open source, yet proprietary.

The network can also be used to distribute content such as software, audio and video that is to be protected from unauthorized access or use. The network can further be used for payment systems. All of these distribution functions depend on providing security mechanisms in the computer systems to ensure that unauthorized accessing of code or data does not take place.

A hardware mechanism can be provided for security that ensures that the initial operating system image has not been tampered with. However, once the system is started, the integrity of the security mechanism depends upon the security of the operating system. Operating systems, however, can be insecure, with some operating systems requiring security fixes at a rate of up to one a week. These continually discovered security breaches represent windows of opportunity for an unauthorized third party to access code.

Other conventional systems provide hardware based security functions in one of two ways. The first is a separate security chip in the computer system, capable of providing the authentication, encryption, and key management functions, such as those specified by the trusted computing alliance (TCA™). Such a separate chip has an advantage that its interface protocols can be limited to these security functions. This can make it very difficult to mount a software attack on such a chip. On the other hand, because the chip is separate from the microprocessor, it is relatively easy to monitor the interfaces and circumvent the protocols. This type of mechanism, for example, therefore does not provide good protection for implementing a secure boot function because the authenticated operating system image can relatively easily be replaced.

Another type of conventional implementation of security hardware involves a security unit integrated in the processor that may, for example, be connected to the processor input/output (I/O), or the memory interface. These integrated security devices provide the authentication and/or encryption functions on the processor chip. Such an arrangement has the advantage that the interface between the processor and such a unit is not easily monitored, and therefore provides a higher degree of protection than a separate security chip. Some of the disadvantages of this arrangement, however, are that the unit can occupy a significant silicon area on the processor chip, which is typically implemented in significantly more expensive technology and that such a unit, if it is to be realized at a reasonable cost (area), can provide basic functionality only. In other words, the unit is not generally programmable, and the array of security functions it can provide is limited. A third limitation can be that communications on the on-chip bus may be monitored if the operating system is compromised.

Therefore, a need exists for a hardware-based security mechanism that overcomes at least some of the disadvantages of conventional hardware-based security mechanisms.

SUMMARY OF THE INVENTION

The present invention provides for dynamically configuring a processor for security functions by partitioning and un-partitioning a local store coupled to a processor for the authentication of code or data. The local store is partitioned into an isolated and non-isolated section. Code or data is loaded into the isolated section. The code or data is authenticated in the isolated section of the local store. In one aspect, the code or data is also decrypted. In another aspect, processor interfaces are disabled in the isolated state.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) can be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPU's, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
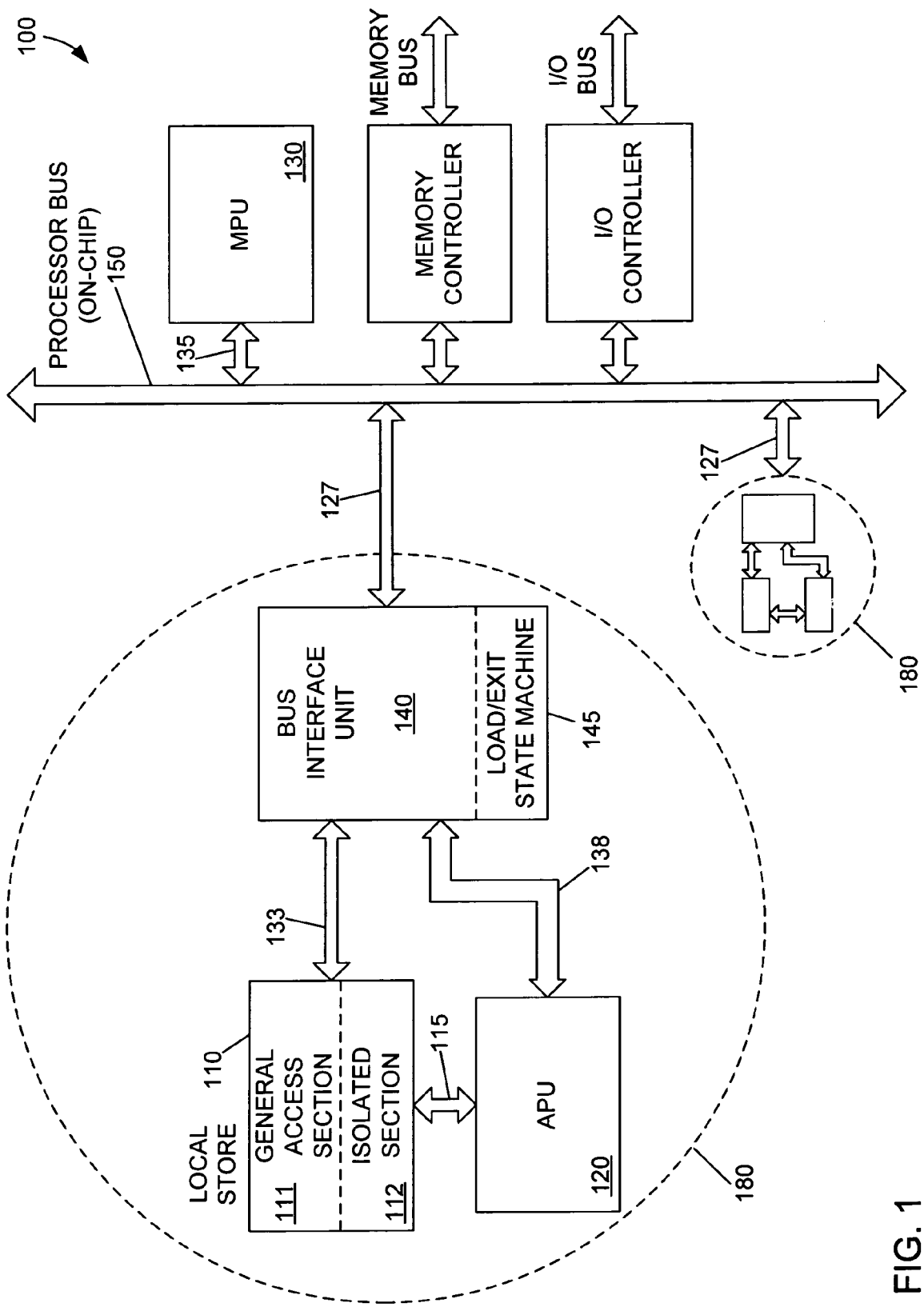
FIG. 1 schematically depicts a system in which the isolation of code or data to be authenticated or decrypted occurs within a local store.

Turning to FIG. 1, disclosed is a system 100 for the authentication of code through the partitioning of a local store (LS) 110 into an isolated section 112 and a non-isolated (general access) section 111. The LS 110 is coupled through an LS bus 115 to an attached processor unit (APU) 120. Generally an APU is a processing device that accesses a local memory, such as the LS 110, instead of a main, or system memory (not illustrated). An APU is typically designed to run specific commands and routines, which can lead to an increased speed and efficiency of processing.

The LS 110 is further coupled through a bus 133 to a bus interface unit (BIU) 140. Generally, the BIU 140 functions as a connection, coupled through bus 127, between the LS 110 and an (on-chip) processor bus 150. In addition, the APU 120 can be capable of issuing or receiving commands or data from the on-chip bus 150 through use of the BIU 140. An MPU 130 is coupled through the bus 135 to the on-chip processor bus 150 with its own bus interface unit (not shown).

The system 100 further comprises a load/exit state machine (LESM) 145. The LESM 145 contains a master key. The LESM 145 utilizes the master key during a load state machine command (also known as a load function). In the system 100, the load/exit state machine is part of the BIU 140. An APU control bus 138 is coupled between the LESM 145 and the APU 120. Generally, the APU control bus 138 is used to convey commands to the APU 120 upon execution of the load or exit command by the LESM 145. This bus can also be used by the APU 120 to issue commands (such as the EXIT command) to the LESM 145. In FIG. 1, aggregation of the LS 110, the APU 120, and the BIU 140, and their respective buses can be generally referred to as an attached processor complex (APC) 180. The master key is not otherwise accessible, and can be unique to each system.

Generally, in the system 100, secure processing is performed within the isolated section 112 memory area of the LS 110. The memory inside the isolated section 112 is addressable only by the APU 120. However, the MPU 130 can access memory in the general access area 111, and the MPU 130 can otherwise access such routines as external and internal debug, test and diagnostic interfaces on the APU 120. In other words, the MPU 130 can issue load and store or DMA commands to memory locations in the local store in either isolated or non-isolated state, but the MPU 130 is restricted to the non-isolated region in the isolated state. Commands to the APC 180 include the "load" and "exit" commands, as well as a variety of other commands including starting and stopping the APC 180 and a variety of commands for debug purposes. All commands that provide direct access to the register file, external debug and control functions or other state of the APC 180 that is protected in the isolated state is disabled when the APC is in isolated state.

The isolated section 112 can be invoked by a "load" command, and be released by an "exit" command. When the "exit" command is issued, the entire LS 110 becomes general access memory 111. The load command is typically issued by the MPU 130. The exit command is typically issued by the APU 120, and by MPU 130 in special cases. The load command partitions the LS 110 into a general access section 111 and an isolated section 112. The load command additionally transfers code and or data (load image) from the system memory to the isolated region 112 of the local store 110, and authenticates and or decrypts this code and data using the master key. Authentication and or decryption can be performed by such algorithms and functions as secure hash algorithm (SHA), data encryption standard (DES) or Rivest, Shamir and Adleman algorithm (RSA), but those of skill in the art understand that other authentication and decryption functions and algorithms are within the scope of the present invention.

If the loaded image of the application is successfully authenticated, the LESM 145 starts execution of the APU 120 at an address within the loaded image in the isolated region. The exit command clears the LS 110 and state information inside the APU 120, and de-partitions the LS 110 into the general access section 111.

The isolation section 112 limits access to sensitive data and code within the isolated section 112 to commands issued from the APU 120. Generally, the partition into the isolated section 112 avoids any other device other than the APU 120 copying, modifying or otherwise corrupting any code or information stored within the isolated section 112. Processing in the LS 110 avoids processing that would otherwise be performed in the general memory by the operating system. Furthermore, processing sensitive code in the isolated area 112 of the LS 110 avoids the possibility of the code being copied or corrupted by other devices within or outside of the system 100, even if the operating system controlling system 100 is compromised.

If the authentication of the loaded code is successful, as determined by the load function and command, the code image in the isolated area of the LS 110 is then invoked/executed. This code image can then provide further security functions to the system, such as encryption, decryption, authentication, validation of the operating system (for example, at system boot time or after returning from a hibernation state), key management, and so on.

In one embodiment, a code section is loaded into the isolated section 112 and authenticated. The master key is then used to extract and decode/decrypt a key from the code or an associated data section. The master key is then erased within the isolated section 112 and control is passed to the code that has been loaded completing the "load" function. Then, a secondary application can be loaded, in segments, in the isolated section 112, and authenticated with the decrypted key decrypted from the original code section. In other words, the load command provides for the authenticated of a loaded application by implementing a key generation and extraction mechanism, such as decryption of a section of the loaded image. Employment of decrypted keys to authenticate the application instead of use of the master key for all authentications can lead to less exposure of the master key within the system. Besides providing an added level of protection for the master key, this process implements the second load function in software rather than hardware, thus providing additional flexibility and performance for the authentication and or decryption algorithms used to load the secure applications. Thus, the secure application is validated and authenticated with the decrypted keys that were decrypted with the aid of the master key.

After the code image is authenticated and has finished executing, the APU 120 issues an exit command. The exit function, invoked by the exit command, is the only way in which the isolated region 112 of the LS 110 can be released to be used as contiguous with the general access section 111.

The exit command also erases all information in the isolated section 112 before releasing the isolated state to the general access section 111. The erasure can occur even if the processing within the system 100 is otherwise in a stopped, paused or aborted condition. In the latter case the exit function is typically invoked by the MPU 130.

In the system 100, the exit function is typically invoked by the APU 110. However, once invoked, the various subroutines of the exit command are performed automatically. In other words, the clearing of the memory within the isolated section 112 occurs automatically after the exit command is issued, register files within the APU 110, and so on. The exit command can also be invoked if the APU 120 is in a non-isolated state as well, in which case the exit command functions as a high-speed LS 110 initialization facility.

In one embodiment, if the code validation and authentication process is deemed to be satisfactory, the load function completes its operation by initiating execution of the loaded code image. However, if the validation process is deemed to be unsatisfactory, the APU 120 maintains the isolated section 112 within the local store 110. The APU 120 is thus deemed to be in an isolated state in a non-resumable stopped condition, state 250 in FIG. 2. At this point, either a new load request or an exit request can then be issued by the MPU 130.

In one embodiment, an isolate enable bit is employed to activate the load function and the other attributes of the system 100. In other words, if this bit is set to one, the ability to accept a load command is enabled. If the isolate enable bit is set to zero, the system 100 cannot initiate the creation of the isolated region 112. The exit function, however, can be available, regardless of the non-volatile isolate enable bit setting. This allows the exit command to be used as a convenient LS 110 initialization facility.

In a further embodiment, prior APU 120 code and related direct memory access data transfer operations are fully completed by any code running in the APU 120 before either the load or exit command is issued. In a still further embodiment, multiple APU's 120 are combined with a general purpose microprocessor, such as the MPU 130, with an on-chip coherent bus. In this embodiment, the operating system runs on the general purpose processor, such as the MPU 130, and the APU's 120 can be configured dynamically by the operating system to provide either security functions or other tasks. In other words, APU's 120 can be dynamically configured as programmable security coprocessors when security functions are required (that is, the isolate valid enable bit equals one). However, the APU's 120 can also be used for other tasks for employment in a non-isolated mode at other times. This supports security functions by supporting the load and exit functions.

In a further embodiment, the system 100 has a plurality of attached processor complex (APC) 180. Each APC 180 performs its own load and exit transitions, as determined by the MPU 130.

Figure 2:
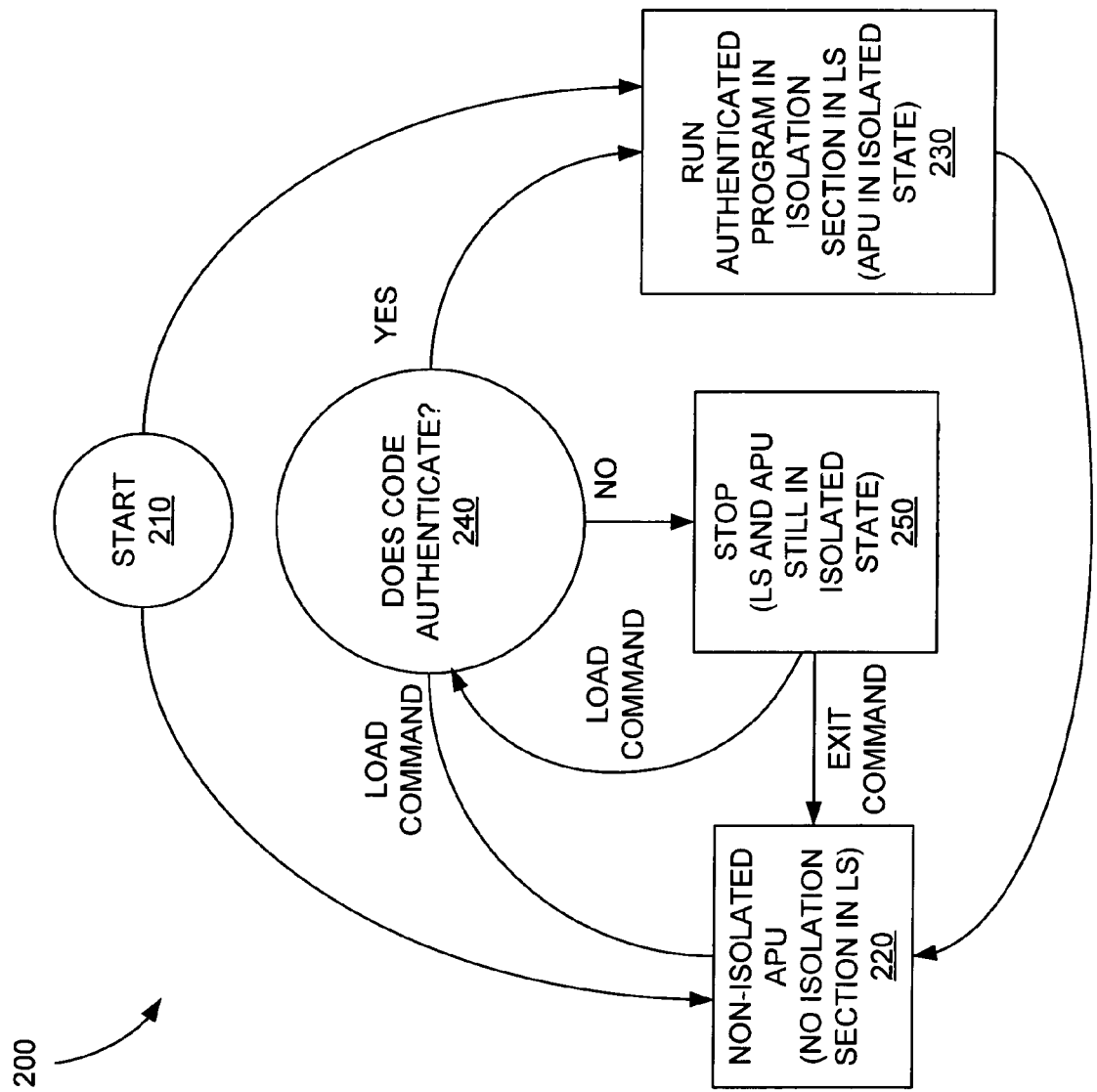
FIG. 2 illustrates a state diagram of transitions between isolated and non-isolated states as initiated by an attached processor unit (APU).

Turning now to FIG. 2, disclosed is a state diagram 200. After a start transition 210 occurs, the state diagram then advances to a non-isolated state 220 or isolated state 230 depending on the initial system configuration. For the purpose of clarity, state diagram 200 is described as first advancing to state 220. However, those of skill in the art understand that the state diagram 200 can step to either state 220 or to state 230.

In state 220, the LS 110 does not have an isolated section 112. Instead, the entire LS 110 is in the general access state 111. The APC 180 is referred to as being in a non-isolated state. Generally, this means that the APC 180 has not been ordered to create an isolation section 112 inside the LS 110.

Then, to initiate either a secure loader or a secure application, as appropriate, the MPU 130 issues the load command. In transition 240, through employment of the master key value, a load image consisting of code and or data is loaded, authenticated and/or decrypted. Decryption can be used to generate at least one decrypted key, which can in turn be used to validate other code stored within the isolated section 112. In any event, if the validation procedure is satisfactory, the load function starts execution of the loaded code image. In one embodiment, this code is a secure loader, responsible for loading the secure application using secondary keys as described above. However, in another embodiment, the code can be the application that is to be secure, such as payment systems, decryption, authentication, key management, and so on, itself.

In the transition to state 230, after the load command is issued by the APU 120 but before the authentication of the code, any instructions processing on the APU 120 have been discontinued. Also, during the transition to state 230, MPU 130 requests to write to the isolated section 112 of the LS 110 are disregarded by the APU 120, and requests by the MPU 130 to read the isolated section 112 of the LS 110 return a value of zero or another constant. The isolated section 112 of the LS 110 is created (with access restricted to only APU 120 initiated load/store commands or instruction fetches). Access to all of the APU 120 debug/test/diagnostic interfaces are disabled. The non-isolated/general access region 111 of the LS 110 retains the same access rights as when the APU 120 has not issued a partition command for the isolated section 112. In addition, the APU 120 asynchronous interrupt is disabled when at least part of the LS 110 is in isolated state 112.

In the transition to state 230, some APU 120 externally accessible registers are typically accessed to obtain a 64-bit direct memory access address. The 64-bit direct memory access address corresponds to a specified point of the image of the code to be loaded to the isolated section 112 of the APU 120. After finding the code and/or data to be authenticated and/or decrypted, the isolated section 112 of the LS 110 is overwritten with the code and/or data to be authenticated and/or decrypted.

However, if the loaded code and or data does not authenticate, state 250 is reached, and further authentication of downloaded code is discontinued. If there is a failure of authentication, as in state 250, the MPU 130 is notified of the authentication failure, while the APU 120 remains in the isolated status, and the LS 110 retains the isolated region 112. In one embodiment, the notification of the MPU 130 is performed by a stop and signal command. However, even after being notified of the authentication failure, the MPU 130 is unable to access the code stored within the isolation section 112 through commands issued to the APU 120.

However, if the load image is authenticated, the APU 120 issues an exit command after the execution of the code image within the isolated section 112 finishes in state 230. Typical secure applications can be authentication, encryption, or decryption functions, such as employed for example in a secure sockets layer (SSL) protocol, secure key management, electronic payment management, storage of "virtual money", periodic validation of the operating system image, and so on. In other words, a secure application can be generally defined as an application in which security and integrity of the application is of concern.

In one embodiment, the APU 120 executes the authenticated code. After the APU 120 issues the exit command, all APU 120 registers, and the isolated section 112 of the LS 110, are erased or overwritten. This can be done to ensure that no code that was previously within the isolated section 112 can be accessed at the instigation of any device. Access to the LS 110 is unrestricted, and access to the APU 120 debug/test/diagnostic interfaces are re-enabled upon completion of the exit process. Finally, the transition to the non-isolated state of the APU 120 is completed when the APU 120 notifies the MPU 130. This can be done by means of an instruction that halts the APU 120 and signals the MPU 130.

However, after the stop state 250 is entered, MPU 130 can issue an exit command to APC 180. The exit command leads to releasing the isolated section 112, and stepping to the state 220. Alternatively, in the stop state 250, MPU 130 can issue another load command to APC 180, thereby loading in other or different code to be authenticated.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A secure processing system, comprising:
a main processor unit (MPU) coupled to a processor bus;
an attached processor complex (APC) coupled to the processor bus and comprising:
an unpartitioned local store configured to store computer instructions and data;
an attached processor unit (APU) coupled to the local store; and
a bus interface unit (BIU) comprising a load/exit state machine (LESM), the LESM having a cryptographic master key;
wherein the APC is configured to receive commands from the MPU via the processor bus and to operate in a non-isolated state and an isolated state; and
wherein in response to a LOAD command to operate in the isolated state received from the MPU, the APC is configured to partition the unpartitioned local store into a general access section accessible by the MPU and an isolated section accessible only by the APU, to transition from the non-isolated state to the isolated state, to transfer a set of computer instructions or data into the isolated section of the local store, and to use the master key in the isolated section of the local store to extract and decrypt a portion of the computer instructions or data stored in the isolated section of the local store, thereby producing another cryptographic key, and wherein in response to producing the another cryptographic key, the master cryptographic key is erased from the isolated section of the local store, and wherein the MPU can issue commands to the local store when not in the isolated state and is restricted to the general access section of the local store in the isolated state, and when the APC is operating in the isolated state, the APC is configured to respond to an EXIT command received from the MPU by clearing the isolated section of the local store and eliminating the isolated section of the local store, thereby causing the general access section to occupy the entire local store, and wherein the another cryptographic key is used to authenticate a secondary application loaded, in segments, in the isolated section of the local store, and wherein the EXIT command is issued after authentication of the secondary application, and wherein an isolate enable bit is used to control issuance of the LOAD command, and wherein during a transition to the isolated state, MPU requests to write to the isolated section of the local store are disregarded by the APU and MPU requests to read from the isolated section of the local store return a null value.

2. The secure processing system as recited in claim 1, wherein secure processing is performed within the isolated section of the local store of the APC.

3. The secure processing system as recited in claim 1, wherein the cryptographic master key stored in the APC is not accessible by the MPU.

4. The secure processing system as recited in claim 1, wherein the cryptographic master key stored in the APC is unique to the secure processing system.

5. The secure processing system as recited in claim 1, wherein when the APC is operating in the non-isolated state, the general access section occupies the entire local store.

6. The secure processing system as recited in claim 1, wherein the APC is configured to use the other cryptographic key to authenticate or decrypt another set of computer instructions or data.

7. The secure processing system as recited in claim 1, wherein the BIU is coupled to the processor bus, and wherein local store and the APU are coupled to the BIU.

8. A method for carrying out secure processing, comprising:
providing a main processor unit (MPU), a processor bus, and an attached processor complex (APC), wherein the APC comprises an unpartitioned local store configured to store computer instructions and data and an attached processor unit (APU) coupled to the local store;
configuring the MPU to drive a LOAD command on the processor bus in the event secure processing is required;
coupling the MPU to the processor bus;
configuring the APC to receive the LOAD command via the processor bus, to store a cryptographic master key, and to operate in a non-isolated state and an isolated state;
configuring the APC to respond to a received LOAD command by:
partitioning the unpartitioned local store into a general access section accessible by the MPU and an isolated section accessible only by the APU;
transitioning from the non-isolated state to the isolated state;
transferring a set of computer instructions or data into the isolated section of the local store; and
using the master key to extract and decrypt a portion of the computer instructions or data stored in the isolated section of the local store, thereby producing another cryptographic key;
configuring the APC to respond to a received EXIT command when operating in the isolated state to exit operation in the isolated state by:
clearing the isolated section of the local store; and de-partitioning the local store to eliminate the isolated section, thereby causing the general access section to occupy the entire local store; and coupling the APC to the processor bus; and wherein the MPU can issue commands to the local store when not in the isolated state and is restricted to the general access section of the local store in the isolated state, and wherein the another cryptographic key is used to authenticate a secondary application loaded, in segments, in the isolated section of the local store, and wherein the EXIT command is issued after authentication of the secondary application, and wherein an isolate enable bit is used to control issuance of the LOAD command, and wherein during a transition to the isolated state, MPU requests to write to the isolated section of the local store are disregarded by the APU and MPU requests to read from the isolated section of the local store return a null value.

9. The method as recited in claim 8, wherein the secure processing is carried out within the isolated section of the local store of the APC.

10. The method as recited in claim 8, wherein the cryptographic master key stored in the APC is not accessible by the MPU.

11. The method as recited in claim 8, wherein the coupling of the MPU and the APC to the processor bus forms a processing system, and wherein cryptographic master key stored in the APC is unique to the processing system.

12. The method as recited in claim 8, wherein when the APC is operating in the non-isolated state, the general access section occupies the entire local store.

13. The method as recited in claim 8, wherein the configuring the APC to respond to a received LOAD command comprises:
 configuring the APC to respond to a received LOAD command by:
  transitioning from the non-isolated state to the isolated state;
  partitioning the local store into a general access section accessible by the MPU and an isolated section accessible only by the APU;
  transferring a set of computer instructions or data into the isolated section of the local store;
  using the master key to extract and decrypt a portion of the computer instructions or data stored in the isolated section of the local store, thereby producing another cryptographic; and
  using the other cryptographic key to authenticate or decrypt another set of computer instructions or data.

14. A secure processing system, comprising:
a main processor unit (MPU) coupled to a processor bus; and
an attached processor complex (APC) coupled to the processor bus and comprising:
 a local store configured to store computer instructions; and
 an attached processor unit (APU) coupled to the local store;

wherein the APC is configured to receive commands from the MPU via the processor bus, to store a cryptographic master key, and to operate in a non-isolated state and an isolated state; and wherein in response to a LOAD command to operate in the isolated state received from the MPU, the APC is configured to:
 partition the local store into a general access section accessible by the MPU and an isolated section accessible only by the APU;
 transition from the non-isolated state to the isolated state;
 disable access to diagnostic interfaces of the APU;
 transfer a first computer code set into the isolated section of the local store;
 authenticate the first computer code set stored in the isolated section of the local store with the master key;
 responsive to successfully authenticating the first computer code set, use the master key to decrypt and extract a second key from the first computer code set;
 responsive to decrypting and extracting the second key from the first computer code set, erase the master key from the isolated section;
 load a second computer code set into the isolated section;
 authenticate the second computer code set using the second key; and
 responsive to authenticating the second computer code set, invoke the second computer code set in the isolated state; and wherein the MPU can issue commands to the local store when not in the isolated state and is restricted to the general access section of the local store in the isolated state, and when the APC is operating in the isolated state, the APC is configured to respond to an EXIT command received from the MPU by clearing the isolated section of the local store and eliminating the isolated section of the local store, thereby causing the general access section to occupy the entire local store, and wherein the another cryptographic key is used to authenticate a secondary application loaded, in segments, in the isolated section of the local store, and wherein the EXIT command is issued after authentication of the secondary application, and wherein an isolate enable bit is used to control issuance of the LOAD command, and wherein during a transition to the isolated state, MPU requests to write to the isolated section of the local store are disregarded APU and MPU requests to read from the isolated section of the local store return a null value.

15. The secure processing system as recited in claim 14, wherein the APC is configured to, upon completion of executing the second computer code set:
 issue the EXIT command to exit operation in the isolated state;
 de-partition the local store; and
 re-enable access to the diagnostic interfaces of the APU.

* * * * *